United States Patent

[11] 3,594,787

[72] Inventor Millard J. Ickes
2020 Davies Way, Los Angeles, Calif. 90046
[21] Appl. No. 842,265
[22] Filed July 16, 1969
[45] Patented July 20, 1971
Continuation-in-part of application Ser. No. 718,583, Apr. 3, 1968.

[54] SCENE SCANNER AND TACTILE DISPLAY DEVICE FOR THE BLIND
7 Claims, 9 Drawing Figs.
[52] U.S. Cl. ..................................... 340/407, 35/35.1, 178/5
[51] Int. Cl. ..................................... G08b 1/00
[50] Field of Search ..................................... 340/407; 35/35.1; 178/5

[56] References Cited
UNITED STATES PATENTS
| | | | |
|---|---|---|---|
| 1,487,115 | 3/1924 | McQuarrie | 35/35.1 X |
| 2,866,279 | 12/1958 | Surber | 35/35.1 |
| 3,395,247 | 7/1968 | Fieldgate | 340/407 X |

Primary Examiner—John W. Caldwell
Assistant Examiner—Michael Slobasky
Attorney—Bernard Kriegel ABSTRACT: A scene scanner and display device is provided which utilizes a plurality of electrically energizable pins to provide a tactile stimulus to a blind person, representing the shape or outline of an object in the field of view of the device. A lens system focuses a limited scene area on a matrix of optical sensors which are individually connected to corresponding matrix of display elements, such as electrically energizable pins. A control permits an adjustment of the sensitivity of the sensors. Objects in a "viewed" scene are represented by protruding pins in the general configuration or shape of the object.

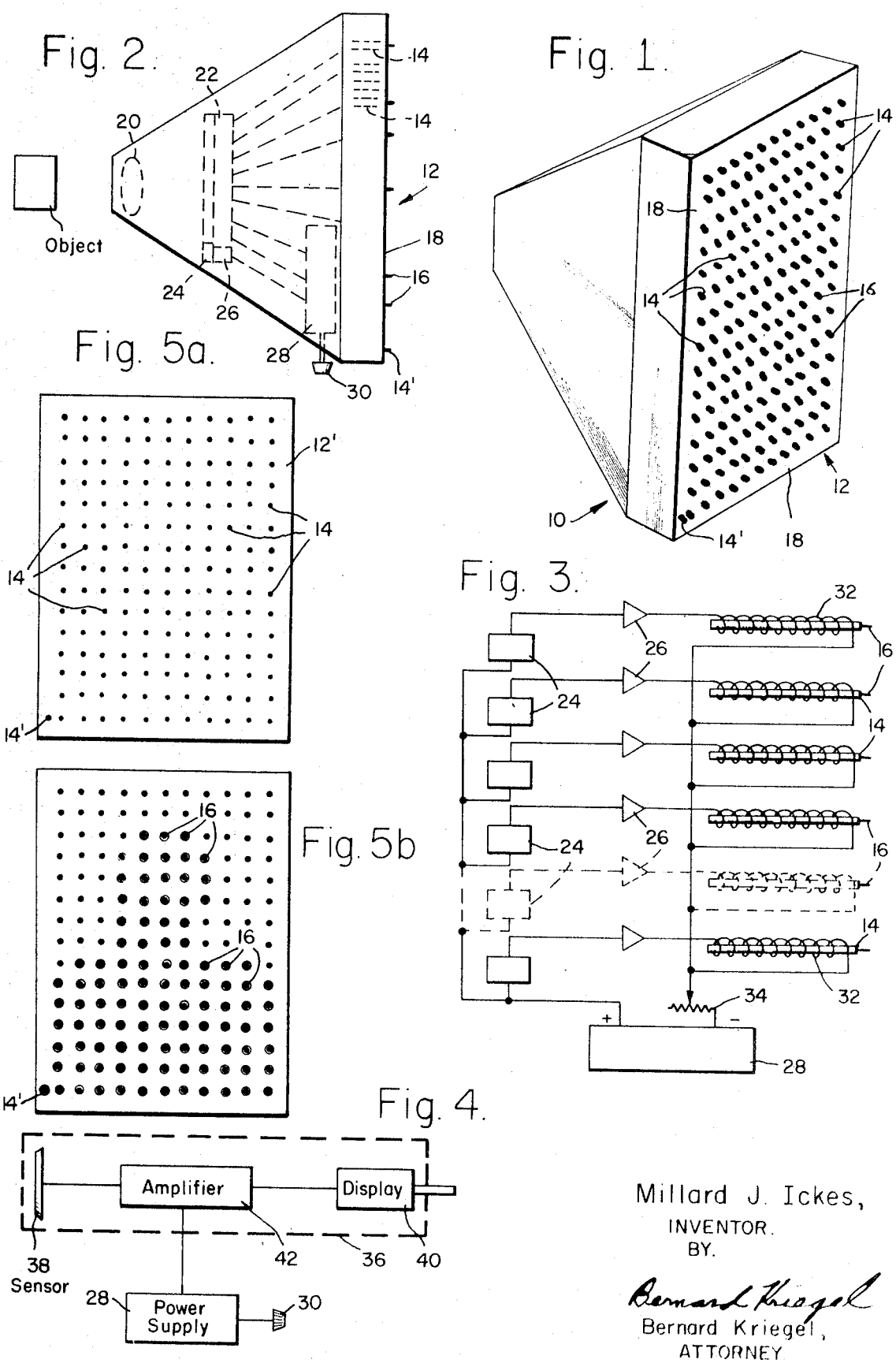

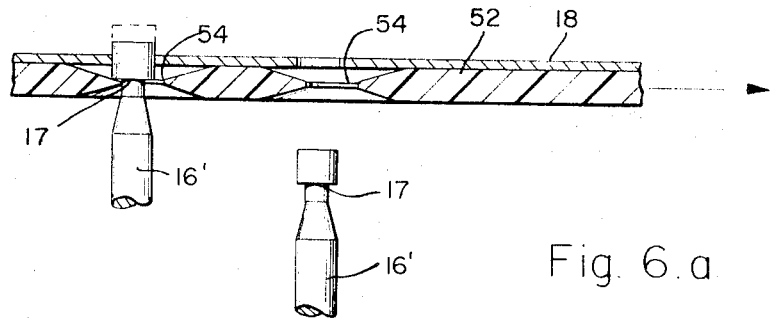
Fig. 6.a
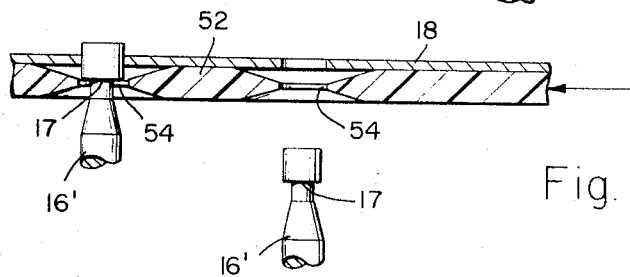
Fig. 6 b
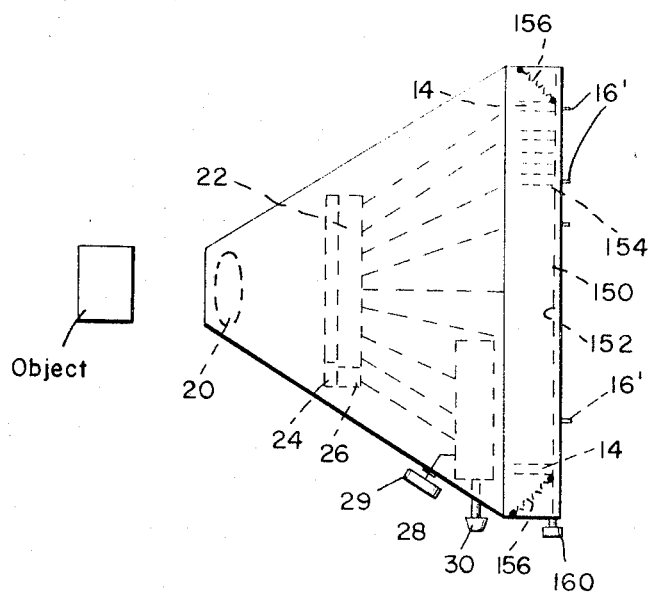
Fig. 7.
Millard J. Ickes,
INVENTOR.
BY.
BERNARD KRIEGEL,
ATTORNEY.

SCENE SCANNER AND TACTILE DISPLAY DEVICE FOR THE BLIND

The present invention relates to apparatus for providing a tactile representation of a scene to the blind, and more particularly to a portable, hand-held unit in which objects in the immediate vicinity are displayed in the form of protruding elements in a matrix to provide a tactile representation of the object, and is a continuation-in-part of my application, Ser. No. 718,583, filed Apr. 3, 1968, for "Scene Scanner and Tactile Display Device for the Blind."

the prior art, most devices intended to aid the blind have utilized auditory cues which result from optical sensors. In recent years, photosensitive devices, such as disclosed in the U.S. Pat. No. 3,198,952 to T. A. Benham et al., had employed a light source which projects a beam that is reflected and returned from obstacles. Other devices have utilized other forms of radiant energy, such as disclosed in the U.S. Pat. No. 2,870,427 to W. E. Frank et al. Yet other patents teach systems for detecting obstacles and objects and include the U.S. Pat. to Walker, No. 2,582,728, Slaymaker, No. 2,567,407, and Clifton, No. 1,798,118.

While these prior art devices usually result in an auditory or audible signal, representative of the scene, substantial training is required to correlate these audible signals with the optical or actinic images presented to the sensors. Most blind persons, however, have, in recent years, received training in "Braille," and it is not unusual in blind persons that the tactile senses have been heightened. Fingers have been trained to "read" patterns and to recognize subtle differences therein, and even for those unschooled in Braille, the recognition of a tactile stimulus is not difficult.

Accordingly, it would be desirable to provide an optical scanner which provides a display in a form that is immediately recognizable to a blind person without special training, and which, in many respects, would resemble a Braille presentation of optical information or a deeply embossed picture.

According to the present invention, an optical transducer is provided which includes a matrix of photosensitive cells, each connected to a display device which, in the preferred embodiment, is an electromagnetically operated plunger. A power supply is provided to energize and/or amplify the output of the optical sensors and to power the display devices. A control is provided to adjust the sensitivity of the sensors and to heighten or reduce the contrast in an optical scene.

The display may be of the "on-off" type in which a pin either protrudes or does not, depending on whether the corresponding area of the scene is "light" or "dark." However, it is within the scope of the invention to provide proportional displacement of the pin, corresponding to relative brightness of the image. In other embodiments, a locking feature may be provided to reduce the drain on the power supply while a scene is "stored" and held for any period of time. Also, other display devices may be employed, such as heating elements, which would provide a thermographic "picture," and objects could be represented by relatively warmer and cooler areas.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only, and are not intended as a definition of the limits of the invention.

Referring to the drawings:

FIG. 1 is a perspective view of a sensing device for the blind according to the present invention;

FIG. 2 is a side cutaway view of the device of FIG. 1;

FIG. 3 is a block diagram of a portion of the elements of the system of FIG. 1;

FIG. 4 is a block-functional diagram of an information channel according to the present invention;

FIGS. 5a and 5b are representations of the display panel of FIG. 1, in which FIG. 5a displays not information and FIG. 5b represents the display provided when "viewing" a "person" in the scene of interest;

FIGS. 6a and 6b are detailed representations of a mechanical storage device for holding display pins after energization in which FIG. 6a represents the "latched" configuration and FIG. 6b represents the "unlateched" configuration; and FIG. 7 is an alternative embodiment of a mechanical storage device.

Turning first to FIG. 1, there is shown in perspective a device, according to the present invention, in a preferred configuration. As seen in FIG. 1, the "guide" or "companion" system 10 provides, in a generally rectangular shape, a matrix 12 of individual display elements 14 which, in this embodiment, are electromagnetically controlled pins 16, shown as protruding from the surface 18 of the matrix 12, being energized upon suitable stimulation of a corresponding optical sensor.

In FIG. 2, it is seen that the system 10 includes a lens system 20 which is adapted to transmit an optical image to a scanning matrix 22, which is comprised of a plurality of individual photosensitive devices 24. Associated with each photosensitive device is an amplifier element 26.

Each of the amplifier elements 26 is directly connected to a different one of the display elements 14, and a common power supply 28 provides electrical energy to drive the entire system. A contrast control 30 is provided to allow for variations in overall brightness or to increase the contrast in specific scenes and is utilized on a continuing basis.

In FIG. 3, there is shown in simplified block diagram form one column of the scanning matrix 22, and the column of the display matrix 12 corresponding thereto. Each of the individual photosensitive devices 24 may be either a photoelectric cell, a photoresistive cell or other sensor or transducer which can be utilized to provide an electrical signal representative of the magnitude of actinic radiation illumination falling upon the device. If a photocell is used, the amplifier 26, which is coupled to the power supply 28, is necessary to assure an adequate driving signal to the display elements 14. In this embodiment, each of the tactile display elements is shown as a solenoid, including coil 32 and the pin 16. The power supply 28 energizes the electrical elements, and a variable resistor 34 is utilized to adjust for contrast and to set the sensitivity level.

It will be recognized by those skilled in the art that the diagram of FIG. 3 is illustrative only, and that the particular circuit to be utilized, as well as the selection of the individual image receptors or the tactile display devices, are a matter of design choice. For example, the art of wire printers, as in computer output devices, would clearly lend itself to the mechanization of the display portion of the present invention. Similarly, it is a matter of design choice whether a photoresistor is utilized as an actinic radiation sensor, or whether a photovoltaic cell is utilized. Obviously, one the choice is made, the remainder of the circuitry is within once skill of the electronic technician.

If the mechanical storage devices described in FIGS. 6 and 7 below are incorporated into the guide 10, it is then feasible to provide for intermittent connection of the power supply 28 to the photosensitive devices 24 and the display elements. Accordingly, there is shown a manually operated pushbutton switch 29, which is interposed between the power supply 28 and the remainder of the systems.

In operation, the switch 29 is momentarily energized to scan a scene, and the individual pins 16' that are advanced will be locked in place by a storage mechanism. The pushbutton 29 can then be released and the pins 16' will remain advanced until they are manually released either by the returning of the individual pins 16' (as in FIG. 6) or by the energization of a release button 160 (as in FIG. 7). This arrangement permits the display device to operate independent of the sensing elements and independent of any power supply display device.

In FIG. 4, therefore, a single information channel 36 is indicated in block form. The channel 36 includes a sensor 38, a display device 40 and an amplifier 42 which may be integral with the sensor 38, the display device 40, or with both, or neither. It will be understood that a scene "viewer" of any desired scale and resolution can be fabricated by assembling an appropriate number of information channels into a matrix, limited only by considerations of power supply and portability.

Utilizing presently available techniques, the photosensitive matrix and amplifiers could be produced as a single integrated structure of relatively small size, which would require only a very simple, lightweight lens system to direct the scene upon the photosensitive surfaces. Alternatively, the amplifiers may be combined with the display elements, so that the electrical output of the photosensitive matrix is sufficient to drive the display.

It is understood that alternative displays might be utilized, such as miniature heating elements (not shown), which would provide a representation of the scene in terms of warmer and cooler elemental areas corresponding to the light and dark areas of the image at the sensors. Such a display panel would have no moving parts, but, of course, would be affected by ambient temperature.

Yet other displays may provide proportional displacement of the movable pins 16, as a function of the relative brightness of the image on the photosensitive device 14 corresponding thereto. Such a display would, of course, entail a greater power drain and would preclude the use of latching or locking circuits to avoid battery drain, such as a mechanical storage system shown in FIGS. 6 or 7 below.

In FIG. 5a, there is shown a representation of a typical display matrix 12', in which none of the pins 16 is energized, and which would represent either the "off" or "quiescent" state of the system, or a scene of uniform brightness with no contrasts.

In FIG. 5b, the matrix of FIG. 5a is shown in an "on" or "active" state and displays an output representative of a person being viewed in the scene of interest. In FIG. 5b, a relatively dark area is signalled by a protruding pin, while the relatively light areas are unaffected. To produce the display of FIG. 5b, each of the information channels is connected so that the energization and protrusion of a pin corresponds to an elemental "dark" area and the nonenergization of a pin corresponds to a "light" area. With the sensing device pointing at a person in a generally "bright" background, the silhouette impression illustrated in FIG. 5b would be presented. Provision could be made for a complementary presentation, such that the relatively bright areas would be represented by protruding pins.

Also shown in the lower corner of the matrix 12' of FIG. 5b is a special pin 14' which functions as a "fail-safe" element. Any time the system is energized, special pin 14' protrudes. The system can then be adjusted to a sensitivity such that a known object in the scene to be viewed would register on the display matrix.

In FIGS. 6a and 6b, there are shown one form of locking arrangement which may be utilized in the present invention, and which could be considered a "mechanical storage device."

As shown in FIG. 6a, a mechanical storage device 50 includes a removable apertured holding plate 52, underlying the surface 18, which is adapted to cooperatively engage the individual pins 16'. The holding plate 52 translates into and out of axial alignment with the pins 16' and apertures in the surface 18. For use in this embodiment, each pin 16' is provided with a peripheral notch 17 which can engage an aperture 54 in the plate 52. Preferably, the plate 52 is made of a relatively soft plastic material, such as polyethylene, polypropylene or a self-lubricating fluorocarbon such as Teflon.

The individual apertures 54 of the plate 52 are shown in FIG. 6a to be chambered so that the edges of the aperture are flexible in the direction of pin movement and are positioned slightly eccentric with respect to the individual pins 16', so that an energized pin 16' deflects the edges of the aperture 54 during energization. Upon full extension of the pin 16', the edges return to an undeflected position as the notch 17 clears the aperture 54. So long as the energized pins 16' are held by the apertures 54, the power energizing the solenoids may be removed.

To restore the pins 16' to the unenergized state, while manual pressure on the protruding pin 16' is sufficient to override the notch-aperture holding combination, it is preferred to translate the plate 52 into the aligned configuration shown in FIG. 6b, permitting the pins 16' to retract normally. Since the plate 52 is of a relatively soft plastic material, the manual restoration of the pins 16' is not difficult. Such a latching mechanism would normally be used only during a learning period since, with experience, a trained operator needs only a brief energization of the pins during which the informational content can be acquired.

Turning finally to FIG. 7, there is shown another alternative mechanization of the storage device in conjunction with the sensing device of FIG. 2. A mechanical storage device 150 includes a holding plate 152 and is apertured to receive individual pins 16', which are shown in greater detail in FIG. 6 above.

The plate 152 is also translatable in the plane orthogonal to the axis of the individual pins 16'. A bias spring 156 holds the plate 152 "out of registration" with the individual pins 16'. A release button 160 enables the plate 152 to be manually translated to a position that is in alignment with the release pins 16'.

In operation, energized pins 16' advance through the apertures 154 collectively displacing the plate 152 until the peripheral notches 17 engage the edges of the individual apertures 154. The pins 16' are then held independent of the power supply. When it is desired to release the protruding pins 16', the manual release button 160 is actuated and the holding plate 152 translates until all of the protruding pins 16' are released.

The principal difference, as between the embodiments of FIGS. 6a and 6b and FIG. 7, is that in the embodiment of FIGS. 6a and 6b, each protruding pin may be manually returned to the unenergized position and the latching mechanism can be selectively engaged or disengaged. In the embodiment of FIG. 7, the mechanism is normally engaged and the manual release 160 must be operated to release all of the energized pins.

While other embodiments and variations can be devised, the present invention contemplate the provision of a tactile representation of an optical sense through the use of a matrix of photosensitive devices each connected to a corresponding one of a plurality of display devices in a display matrix. The system would be portable and self-contained, including a power supply. The range and resolution of the system is limited only by the number of information channels utilized and by the depth of field capability of the optical system. While the system has general reference to the optical spectrum, appropriate sensors sensitive to other portions of the actinic spectrum might be utilized to energize the tactile display.

I claim:

1. A portable guidance device for providing a tactile representation of a scene, comprising:
   a. photoresponsive sensing means including a plurality of discrete photosensitive receptors, each adapted to receive a discrete elemental portion of the actinic radiation image of a scene to be represented and to generate an electrical signal representative thereof;
   b. sensitivity control means coupled to said sensing means and adapted to be connected to a source of power for adjusting the sensitivity of said receptors to impinging radiation to establish appropriate contrast levels as between relatively light and dark portions of a scene;
   c. tactile display means including a corresponding plurality of display elements, each comprising a pin having a peripheral notch and respectively coupled to a receptor of said photoresponsive sensing means, said display means being operable in response to electrical signals from said sensing means to provide a bilevel tactile stimulus corresponding to and representative of the actinic image impinging upon said sensing means; and d. display storage means coupled to said display means for holding displayed information independent of sensing means signals and including holding plate means having a plurality of apertures corresponding to the plurality of display elements and in axial alignment therewith, said holding plate means being adapted for limited translational motion out of axial alignment to engage the peripheral notches of extended pins.

2. A portable guidance device as defined in claim 1, wherein said holding plate means is made of a relatively soft, deformable plastic material.

3. A portable guidance device defined in claim 2 wherein each of said holding plate means apertures is chamfered and the peripheral edges of each of said aperture is deformable by an extending pin when said holding plate means apertures are out of axial alignment, and said aperture edges have sufficient rigidity to hold said pins in the extended position, against normal restoring forces.

4. A guidance device for providing a tactile representation of a scene, comprising:

a. photoresponsive sensing means including a plurality of discrete photosensitive receptors, each adapted to receive a discrete elemental portion of the radiation image of a scene to be represented and to generate an electrical signal representative thereof;

b. tactile display means including a corresponding plurality of display elements, each comprising a pin having a peripheral notch and respectively coupled to a receptor of said photoresponsive sensing means, said display means being operable in response to electrical signals from said sensing means to provide a bilevel tactile stimulus corresponding to and representative of the radiation image impinging upon said sensing means; and c. display storage means coupled to said display means for holding displayed information independent of sensing means signals including holding plate mean having a plurality of apertures corresponding to the plurality of display elements and in axial alignment therewith, said holding plate means being adapted for limited translational motion out of axial alignment to engage the peripheral notches of extended pins.

5. A portable guidance device as defined in claim 4, wherein said holding plate means is made of a relatively soft, deformable plastic material.

6. A portable guidance device as defined in claim 5, wherein each of said holding plate means apertures is chamfered and the peripheral edges of each of said apertures is deformable by an extending pin when said holding plate means apertures are out of axial alignment, and said aperture edges have sufficient rigidity to hold said pins in the extended position, against normal restoring forces.

7. A device for providing a tactile representation of a scene, comprising:

a plurality of light sensitive elements arranged in a matrix plane and oriented to receive radiation emanating from said scene, said elements providing an electric signal of magnitude functionally related to the degree of illumination thereof;

an equal number of pinlike members arranged in a matrix plane, said members being interconnected with the light sensitive elements on a one-for-one basis and responsive to signals from said elements to extend outwardly of the matrix plane for tactile sensing; and means interrelated with said pinlike members for maintaining the members extended to provide storage of a tactile representation; and selectively actuatable means for releasing the extended members.